(12) United States Patent
Chang et al.

(10) Patent No.: US 7,497,317 B2
(45) Date of Patent: Mar. 3, 2009

(54) APPARATUS FOR CONVEYING AND RAISING OBJECTS

(75) Inventors: Sou-Chen Chang, Tai-Chung Hsien (TW); Chao-Huang Wu, I-Lan Hsien (TW)

(73) Assignee: Chunghwa Picture Tubes, Ltd., Taipei (TW)

(*) Notice: Subject to any disclaimer, the term of this patent is extended or adjusted under 35 U.S.C. 154(b) by 478 days.

(21) Appl. No.: 11/163,866

(22) Filed: Nov. 2, 2005

(65) Prior Publication Data

US 2007/0098539 A1    May 3, 2007

(51) Int. Cl.
*B65G 47/10* (2006.01)
(52) U.S. Cl. .............................. 198/370.09; 198/347.1
(58) Field of Classification Search ............ 198/370.09, 198/343.1, 346, 600, 860.1, 414, 400, 370.06, 198/370.1, 457.02, 457.03, 375, 597, 371.2, 198/371.3, 406, 347.1, 347.3; 414/788.1, 414/785, 788, 331.14, 427, 564, 633; 193/35 MD
See application file for complete search history.

(56) References Cited

U.S. PATENT DOCUMENTS

| | | | | |
|---|---|---|---|---|
| 4,456,116 A | * | 6/1984 | Jarman | 198/414 |
| 5,501,564 A | * | 3/1996 | Doche | 414/331.13 |
| 6,019,211 A | * | 2/2000 | Masciarelli, Jr. | 198/345.1 |
| 6,591,962 B2 | * | 7/2003 | Miyake | 198/347.1 |
| 6,669,003 B2 | * | 12/2003 | Vassel | 198/435 |
| 6,681,916 B2 | * | 1/2004 | Hiroki | 198/347.1 |
| 7,042,553 B2 | * | 5/2006 | An et al. | 355/72 |
| 7,188,721 B1 | * | 3/2007 | Wu et al. | 198/414 |
| 7,314,344 B2 | * | 1/2008 | Chen et al. | 414/763 |

* cited by examiner

*Primary Examiner*—Gene Crawford
*Assistant Examiner*—William R Harp
(74) *Attorney, Agent, or Firm*—Winston Hsu

(57) ABSTRACT

A conveying and raising apparatus includes a conveying mechanism and a raising mechanism. The conveying mechanism includes a roller for conveying a first object while rotating, and a motor for rotating the roller. The raising mechanism includes a frame installed beside the roller, a plurality of pins fixed on the frame, and an actuator connected to the frame for raising a second object above the plurality of pins from a first height to a second height. The frame has an opening capable of allowing the first object to pass through.

19 Claims, 7 Drawing Sheets

APPARATUS FOR CONVEYING AND RAISING OBJECTS

BACKGROUND OF THE INVENTION

1. Field of the Invention

The present invention relates to a conveying and raising apparatus, and more particularly, to a conveying and raising apparatus capable of raising an object and bypassing another object.

2. Description of the Prior Art

A flat display panel, such as a liquid crystal display (LCD) panel or a plasma display panel, is made of a glass substrate panel. In the manufacturing process, an automatic transport device is utilized to transport the panels in order to improve efficiency. Sometimes, for purpose of inspecting or repairing a panel, the automatic transport device needs to raise the panel for facilitating a robot arm or an operator to carry the panel.

Please refer to FIG. 1 through FIG. 3, FIG. 1 shows a conveying and raising apparatus 100 of the prior art, FIG. 2 shows the conveying and raising apparatus 100 of FIG. 1 before raising a panel 10, and FIG. 3 shows a plurality of pins 122 of the conveying and raising apparatus 100 of FIG. 1 raising the panel 10. As shown in the figures, the conveying and raising apparatus 100 comprises a conveying mechanism 110 and a raising mechanism 120. The conveying mechanism 110 comprises a plurality of rollers 112 and a motor 114. The conveying mechanism 110 further comprises a plurality of wheels 116 installed on the roller 112. When the motor 114 rotates the plurality of rollers 112, the wheels 116, which contact with the panel 10, move the panel 10 forward. The raising mechanism 120 comprises a plurality of supporting ribs 124, a plurality of pins 122, and an actuator 126. The supporting ribs 124 and the rollers 112 are interlaced. The pins 122 are fixed on the supporting ribs 124. The actuator 126 comprises a base plate 1261 and a plurality of racks 1262. Each of the racks 1262 has one end installed on the base plate 1261 and another end fixed on the supporting ribs 124. Each of the racks 1262 separates the base plate 1261 from the supporting ribs 124. The actuator 126 is typically not a hydraulic-cylinder actuator but an air-cylinder actuator in order to reduce dust contamination. Before sending the panel 10 to the inspection station, the raising mechanism 120 needs to raise the panel 10 to facilitate a robot arm to carry the panel 10. Therefore, the actuator 126 pushes up the supporting ribs 124 to raise the panel 10 above the plurality of pins 122 (the panel 10 staying on the wheels 116) to a specific height.

Before raising the panel 10, the plurality of pins 122 are lower than the rollers 112. Therefore, the panel 10 can be moved forward. However, when the plurality of pins 122 are pushed up higher than the rollers 112, the plurality of pins 122 will block the route for conveying the panels. Therefore, when the panel 10 is raised to the specific height, the conveying mechanism 110 cannot convey other panels. If panel inspection is too frequent or too slow, the other panels, which are behind the inspected panel, will stop moving forward on the line. Moreover, for time-related processes, the above situation can affect product quality due to panels staying in some process too long.

SUMMARY OF THE INVENTION

It is therefore an objective of the claimed invention to provide a conveying and raising apparatus in order to solve the problems of the prior art.

The present invention provides a conveying and raising apparatus including a conveying mechanism and a raising mechanism. The conveying mechanism includes a roller for conveying a first object while rotating, and a motor for rotating the roller. The raising mechanism includes a frame installed beside the roller, a plurality of pins fixed on the frame, and an actuator connected to the frame for raising a second object above the plurality of pins from a first height to a second height. The frame has an opening capable of allowing the first object to pass through.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
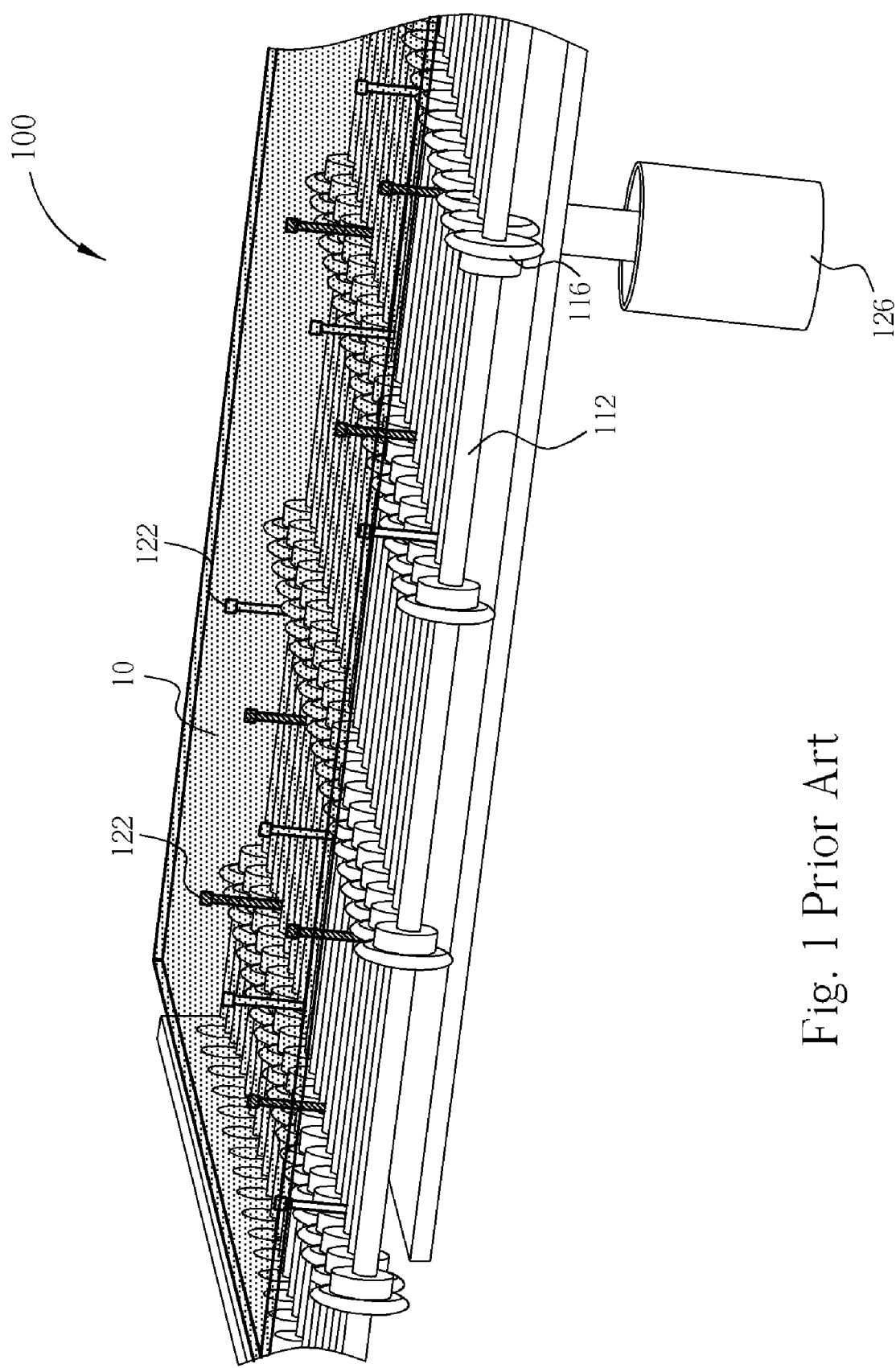
FIG. 1 is a diagram showing a conveying and raising apparatus of the prior art.
Figure 2:
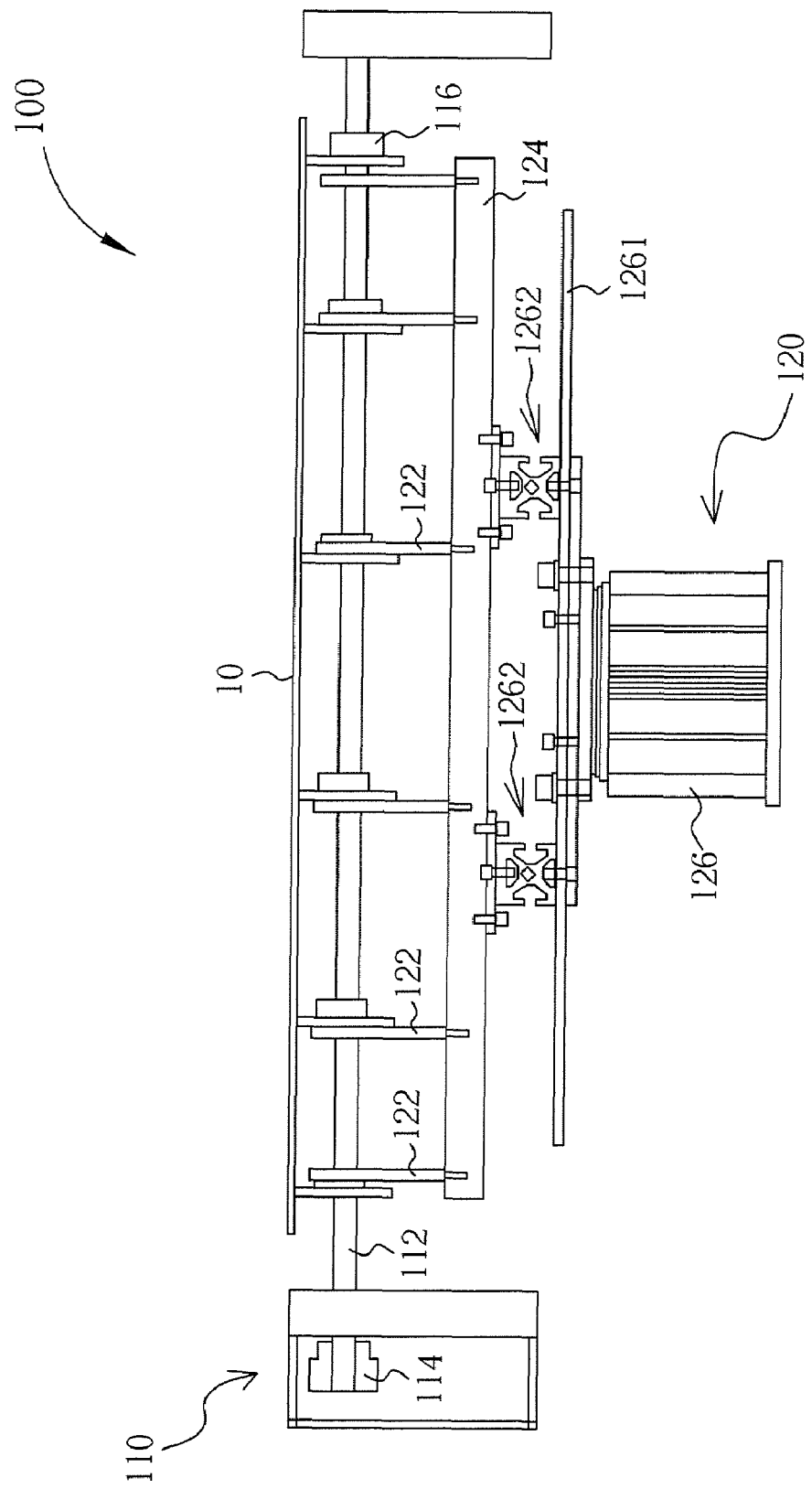
FIG. 2 is a diagram showing the conveying and raising apparatus of FIG. 1 before raising a panel.
Figure 3:
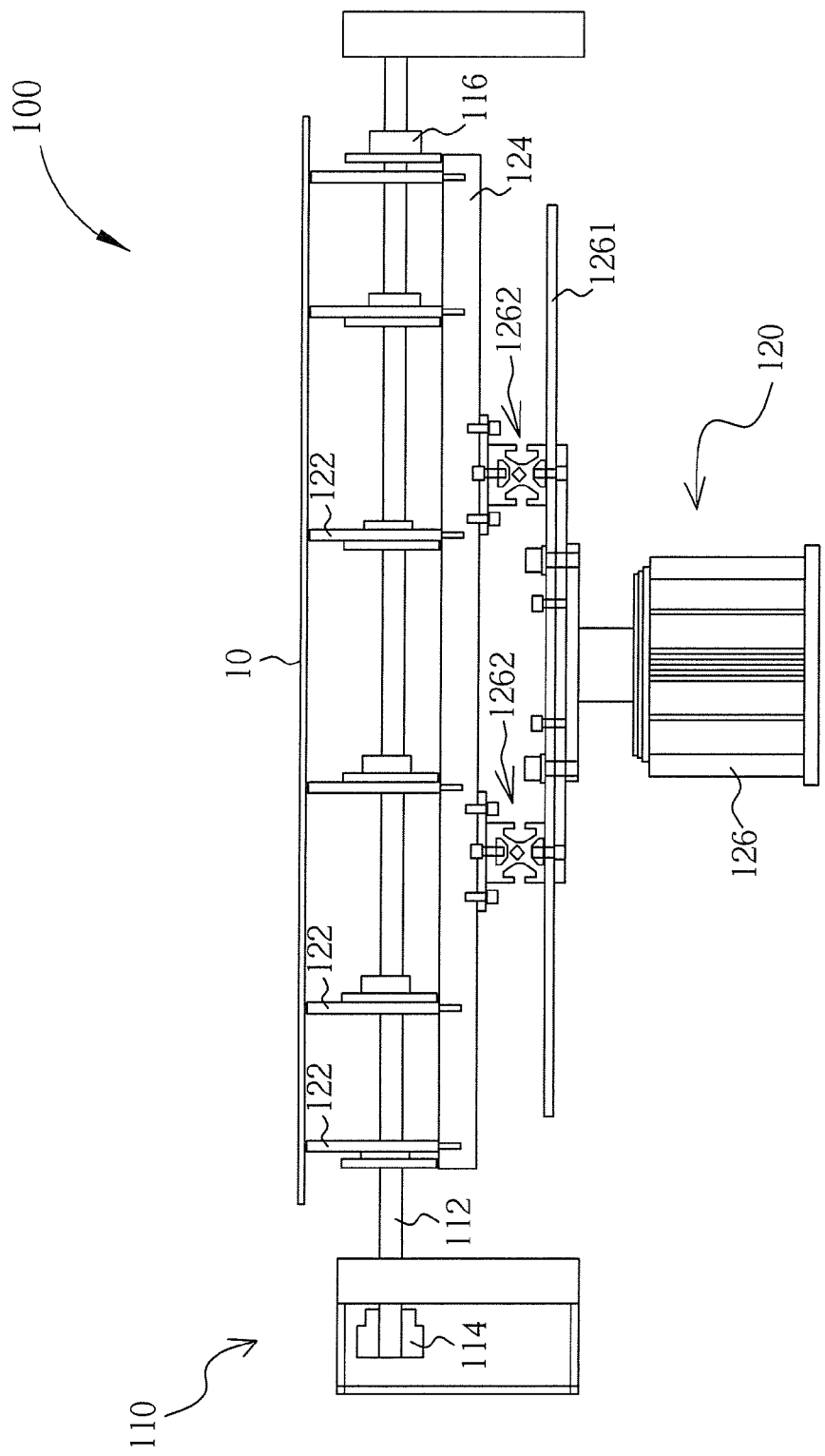
FIG. 3 is a diagram showing a plurality of pins of the conveying and raising apparatus of FIG. 1 raising the panel.
Figure 4:
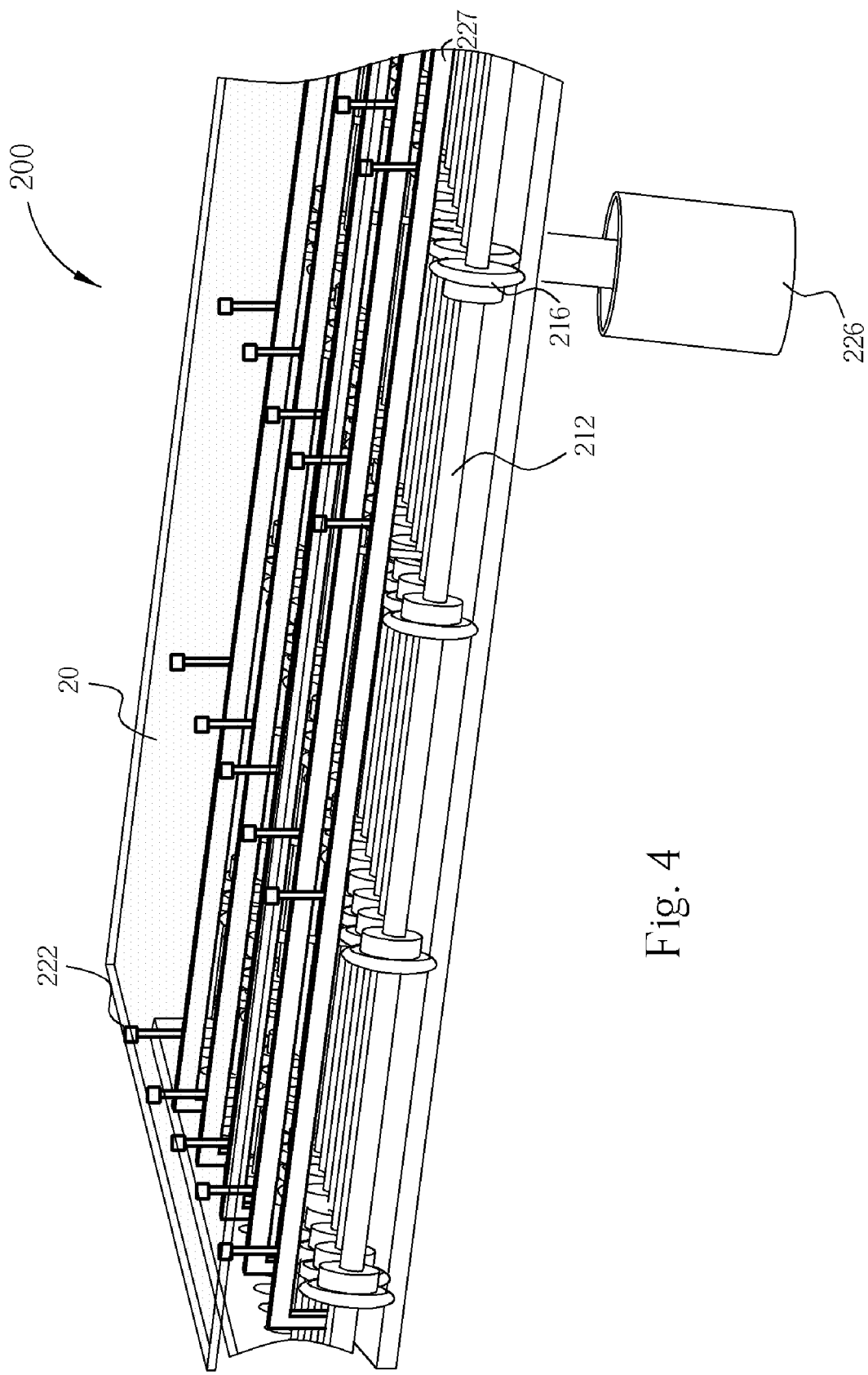
FIG. 4 is a diagram showing a conveying and raising apparatus of the present invention.
Figure 5:
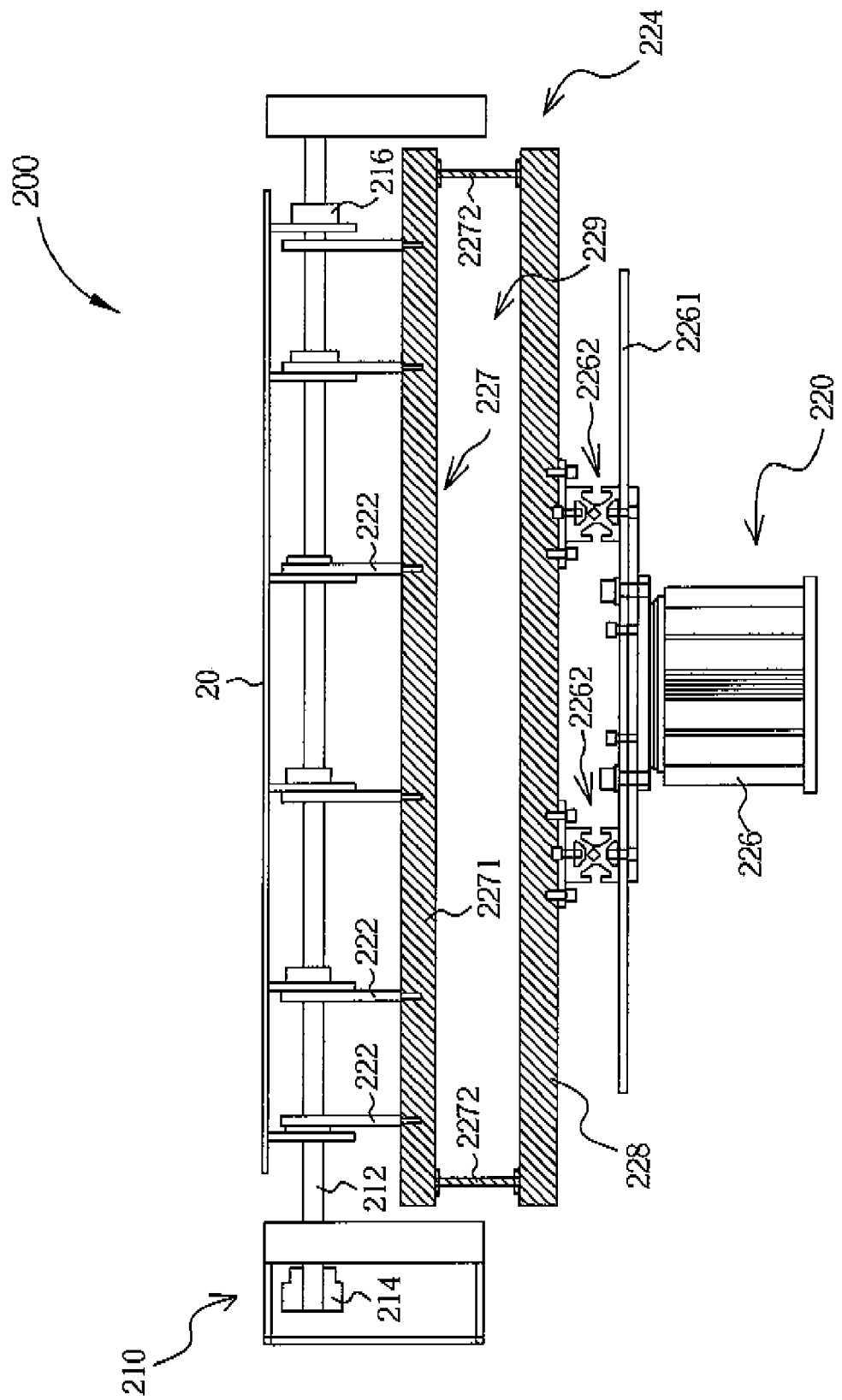
FIG. 5 is a diagram showing the conveying and raising apparatus of FIG. 4 before raising a panel.
Figure 6:
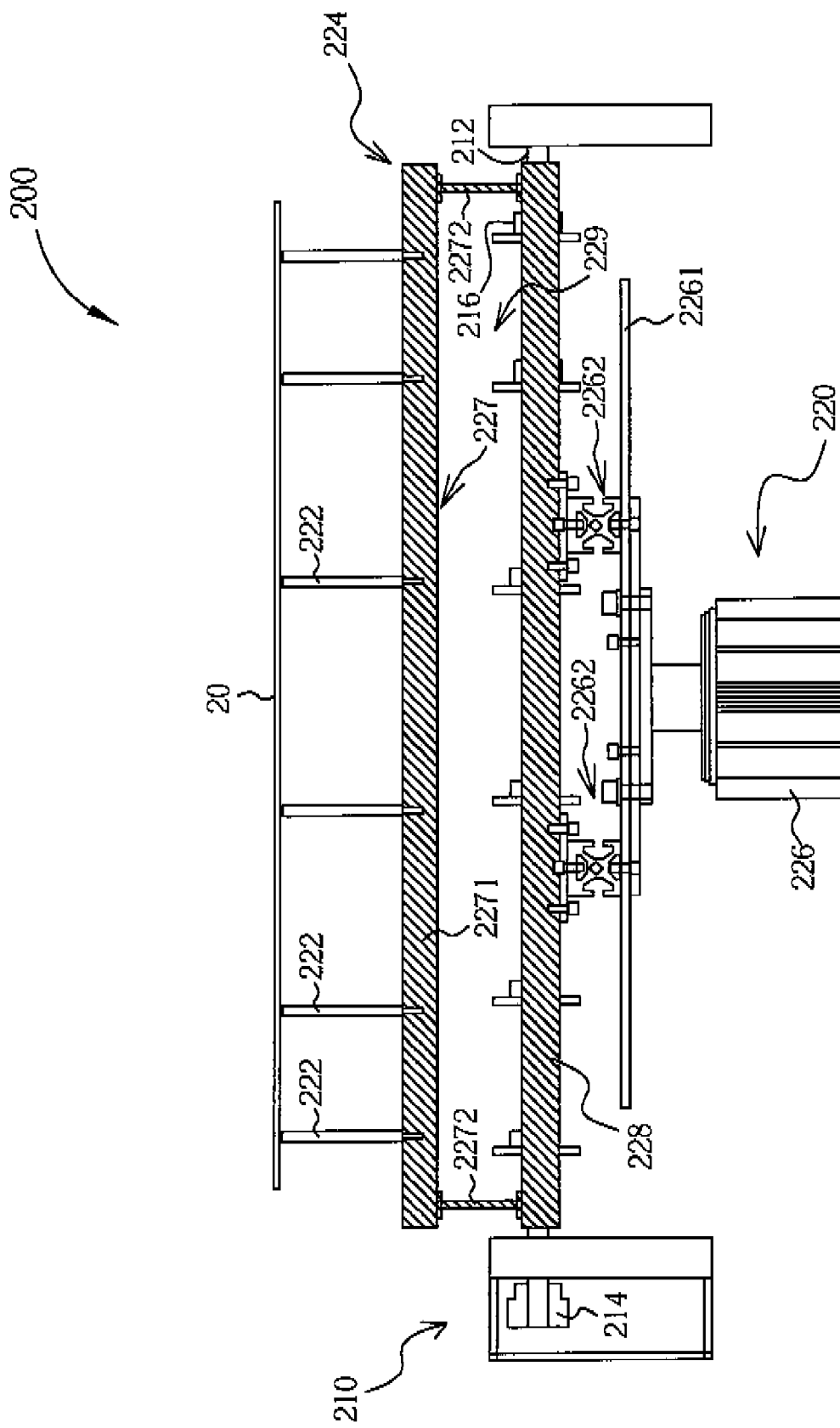
FIG. 6 is a diagram showing a plurality of pins of the conveying and raising apparatus of FIG. 4 raising the panel.

Please refer to FIG. 4 through FIG. 6. FIG. 4 shows a conveying and raising apparatus 200 of the present invention, FIG. 5 shows the conveying and raising apparatus 200 of FIG. 4 before raising a panel 20, and FIG. 6 shows a plurality of pins 222 of the conveying and raising apparatus 200 of FIG. 4 raising the panel 20. As shown in the figures, the conveying and raising apparatus 200 comprises a conveying mechanism 210 and a raising mechanism 220. Because the conveying mechanism 210 of the present invention is similar to the conveying mechanism 110 of the prior art, the conveying mechanism 210 will not be further described. The raising mechanism 220 of the present invention comprises a plurality of frames 224, a plurality of pins 222, and an actuator 226. The frames 224 and the rollers 212 are interlaced, Each frame 224 comprises an inverted U-shaped holder 227 and a base 228. The inverted U-shaped holder 227 comprises an upper frame 2271 and two side spacers 2272. The side spacers 2272 connect the inverted U-shaped holder 227 and the base 228 to form an opening 229 capable of allowing a panel to pass through. The pins 222 are fixed on the surface of the upper frame 2271 of the inverted U-shaped holder 227. The actuator 226 comprises a base plate 2261 and a plurality of racks 2262. Each of the racks 2262 has one end installed on the base plate 2261 and another end fixed on the base 228 of the frame 224. Each of the racks 1262 separates the base plate 2261 from the base 228 of the frame 224. The actuator 226 is an air-cylinder actuator in order to reduce dust, however, other actuators can also be used.

Figure 7:
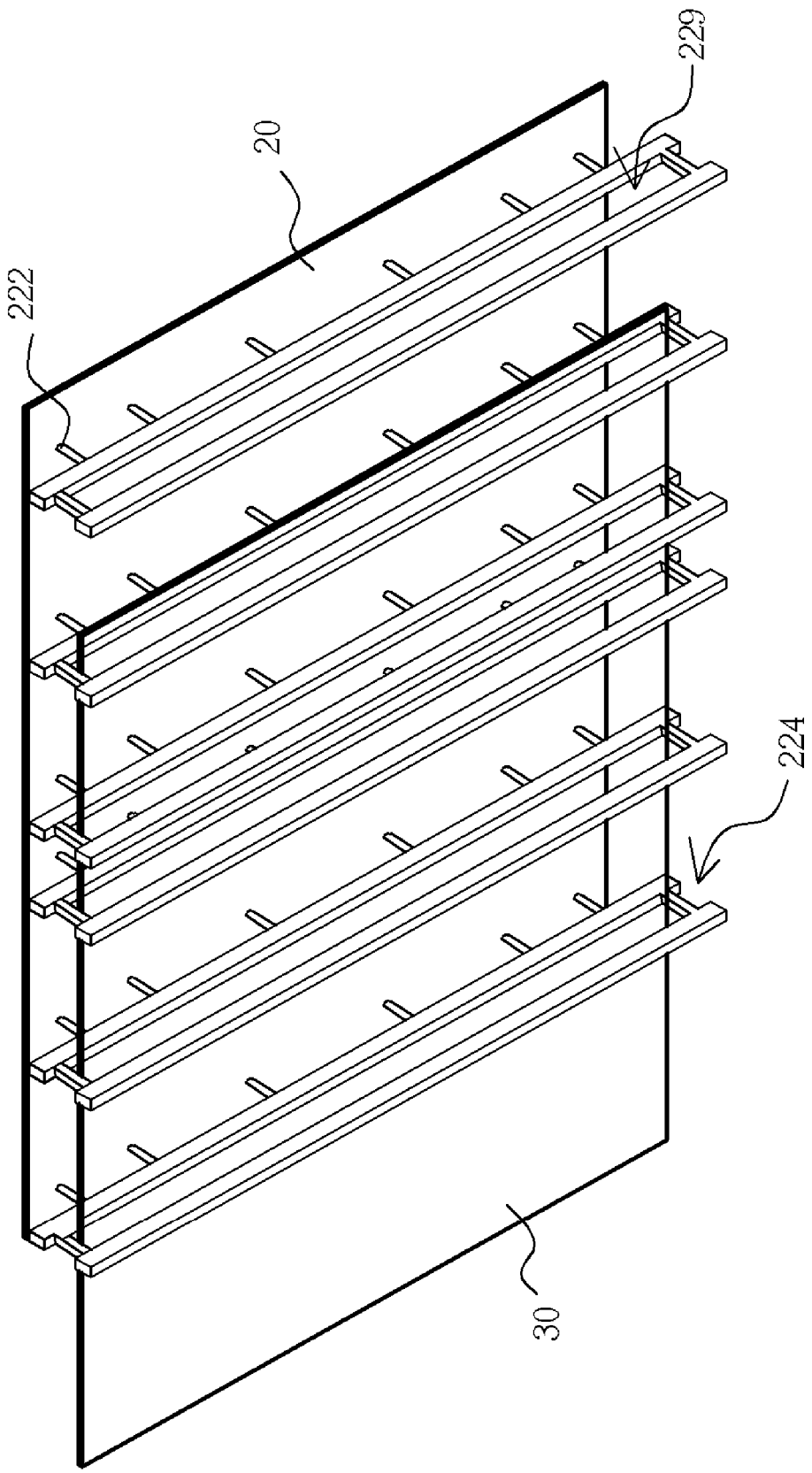
FIG. 7 is a diagram showing a panel passing through openings of frames when the plurality of pins raise another panel.

Before raising the panel 20, the plurality of pins 222 are lower than the rollers 216. Therefore, the panel 20 can be moved forward. When the actuator 226 pushes up the frames 224 to raise the panel 20 above the plurality of pins 222 (the panel 20 staying on the wheels 216) to the specific height, although the plurality of pins 222 are higher than the rollers 216, the frame 224 has an opening 229 capable of allowing a panel to pass through. Therefore, the conveying mechanism 210 can still convey other panels, such as bypassing a panel 30 through the opening 229. Please refer to FIG. 7. FIG. 7 shows the panel 30 passing through the openings 229 of the frames 224 when the plurality of pins 222 raise the panel 20.

Summarizing the above, the present invention provides a conveying and raising apparatus 200 that is capable of raising a panel 20 and bypassing another panel 30 at the same time. In the above preferred embodiment, the present invention is utilized to convey and raise panels, such as liquid crystal display panels, plasma display panels, or glass substrate panels, etc. However, the present invention can also be utilized to convey and raise other objects, as long as a transport device is utilized to raise an object and bypass another object through an opening.

In contrast to the prior art, the present invention is capable of raising a panel and bypassing another panel, such that the panel conveyance can continue without pause. This can increase productivity. Furthermore, panel inspection can be performed more often and in a more detailed manner without the concern of pausing the production line, in order to improve product quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for conveying and raising objects, comprising:
    a conveying mechanism comprising:
        a roller for conveying a first object while rotating; and
        a motor for rotating the roller; and
    a raising mechanism comprising:
        a frame installed adjacent the roller, the frame comprising an inverted U-shaped holder having two side spacers and an upper frame, and a base, the inverted U-shaped holder and the base forming an opening;
        a plurality of pins fixed on the upper frame of the inverted U-shaped holder of the frame; and
        an actuator comprising a base plate and a plurality of racks, each of the racks having a first end installed on the base plate and a second end fixed on the base of the frame for pushing up the frame to raise a second object above the plurality of pins from a first height to a second height, the racks separating the base plate from the base of the frame.

2. The apparatus of claim 1 wherein the raising mechanism is installed below the conveying mechanism.

3. The apparatus of claim 1 wherein the plurality of pins are lower than the roller before the actuator pushes the frame up.

4. The apparatus of claim 1 further comprising a plurality of wheels installed on the roller.

5. The apparatus of claim 1 wherein the first and second objects are panels.

6. The apparatus of claim 5 wherein the first and second objects are liquid crystal display (LCD) panels.

7. The apparatus of claim 5 wherein the first and second objects are plasma display panels.

8. The apparatus of claim 5 wherein the first and second objects are glass substrate panels.

9. The apparatus of claim 5 wherein the opening of the frame is capable of allowing a panel to pass through.

10. The apparatus of claim 1 wherein the actuator is an air-cylinder actuator.

11. An apparatus for raising a panel, comprising:
    a frame comprising an inverted U-shaped holder having two side spacers and an upper frame, and a base, the inverted U-shaped holder and the base forming an opening capable of allowing a first panel to pass through;
    a plurality of pins fixed on the upper frame of the inverted U-shaped holder of the frame for supporting a second panel; and
    an actuator comprising a base plate and a plurality of racks, each of the racks having a first end installed on the base plate and a second end fixed on the base of the frame for pushing up the frame to raise the second panel above the plurality of pins from a first height to a second height, the racks separating the base plate from the base of the frame.

12. The apparatus of claim 11 wherein the first and second panels are liquid crystal display (LCD) panels.

13. The apparatus of claim 11 wherein the first and second panels are plasma display panels.

14. The apparatus of claim 11 wherein the first and second panels are glass substrate panels.

15. The apparatus of claim 11 wherein the actuator is an air-cylinder actuator.

16. An apparatus for conveying and raising objects, comprising:
    a conveying mechanism for conveying a first object and a second object; and
    a raising mechanism comprising:
        a frame comprising two side spacers, an upper connecting frame, and a base to form an opening;
        a plurality of pins fixed on the upper connecting frame; and
        an actuator for raising the frame from a first position where the upper connecting frame is not above the conveying mechanism to a second position where the upper connecting frame is above the conveying mechanism such that the first object is conveyed through the opening.

17. The apparatus of claim 16 wherein at least one of the plurality of pins is contacting the second object.

18. The apparatus of claim 16 wherein the plurality of pins is pointing away from the opening.

19. The apparatus of claim 18 wherein the conveying mechanism comprises a roller and the plurality of pins is not above the roller when in the first position.

* * * * *